(12) United States Patent
Butler

(10) Patent No.: US 11,694,284 B2
(45) Date of Patent: *Jul. 4, 2023

(54) COMBINED LABEL FOR FOOD PREPARERS AND FOOD SERVERS IN TABLE SERVICE RESTAURANTS AND METHOD OF USING SAME

(71) Applicant: Iconex LLC, Duluth, GA (US)

(72) Inventor: Jerry Butler, Gainesville, GA (US)

(73) Assignee: Iconex LLC, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,194

(22) Filed: Sep. 23, 2021

(65) Prior Publication Data

US 2022/0012824 A1 Jan. 13, 2022

Related U.S. Application Data

(63) Continuation of application No. 16/796,659, filed on Feb. 20, 2020, now Pat. No. 11,238,548, which is a continuation of application No. 15/799,353, filed on Oct. 31, 2017, now Pat. No. 10,664,934, which is a continuation of application No. 13/755,149, filed on Jan. 31, 2013, now Pat. No. 9,886,728.

(51) Int. Cl.
*G06Q 50/12* (2012.01)
*G06Q 10/10* (2023.01)
*G06Q 30/0601* (2023.01)

(52) U.S. Cl.
CPC ............. *G06Q 50/12* (2013.01); *G06Q 10/10* (2013.01); *G06Q 30/0621* (2013.01)

(58) Field of Classification Search
CPC ..... G06Q 50/12; G06Q 10/10; G06Q 30/0621
USPC .......................................................... 705/15
See application file for complete search history.

(56) References Cited

U.S. PATENT DOCUMENTS 6,359,444 B1 3/2002 Grimes
8,224,700 B2 7/2012 Silver
(Continued)

OTHER PUBLICATIONS

"U.S. Appl. No. 13/755,149, Advisory Action dated Sep. 2, 2014", 3 pgs.
(Continued)

*Primary Examiner* — Garcia Ade
(74) *Attorney, Agent, or Firm* — Schwegman Lundberg & Woessner, P.A.

(57) ABSTRACT

A method is provided of processing a food order in a table service restaurant. The method comprises receiving a food order including a table identifier, and electronically by a computer terminal, printing a food order label including the table identifier and providing the printed food order label. The method also comprises by a food preparer, preparing a food dish based upon the printed food order label, and by the food preparer, placing the prepared food dish in a position in vicinity of the printed food order label. The method further comprises by the food preparer or a food server, picking up the prepared food dish and attaching the printed food order label to the food dish with the table identifier being visible, and by a food server, delivering the prepared food dish to the table indicated by the visible table identifier on the printed food order label and thereby delivering the prepared food dish to a customer in the table service restaurant.

20 Claims, 4 Drawing Sheets

(56) References Cited

U.S. PATENT DOCUMENTS

| | | | | |
|---|---|---|---|---|
| 2005/0037172 | A1* | 2/2005 | Adams | G09F 3/0288 |
| | | | | 428/40.1 |
| 2009/0017237 | A1* | 1/2009 | Rawlings | B41M 5/42 |
| | | | | 428/32.84 |
| 2014/0214561 | A1 | 7/2014 | Butler | |
| 2018/0122023 | A1 | 5/2018 | Butler | |
| 2020/0193535 | A1 | 6/2020 | Butler | |
| 2021/0264545 | A9 | 8/2021 | Butler | |

OTHER PUBLICATIONS

"U.S. Appl. No. 13/755,149, Advisory Action dated Dec. 1, 2016", 3 pgs.

"U.S. Appl. No. 13/755,149, Appeal Brief filed Feb. 22, 2017", 11 pgs.

"U.S. Appl. No. 13/755,149, Decision on Pre-Appeal Brief dated Sep. 15, 2015", 2 pgs.

"U.S. Appl. No. 13/755,149, Decision on Pre-Appeal Brief dated Dec. 3, 2014", 2 pgs.

"U.S. Appl. No. 13/755,149, Final Office Action dated Jun. 12, 2014", 15 pgs.

"U.S. Appl. No. 13/755,149, Final Office Action dated Aug. 25, 2016", 11 pgs.

"U.S. Appl. No. 13/755,149, Non Final Office Action dated Feb. 2, 2016", 8 pgs.

"U.S. Appl. No. 13/755,149, Non Final Office Action dated Apr. 6, 2015", 12 pgs.

"U.S. Appl. No. 13/755,149, Non Final Office Action dated Dec. 26, 2013", 10 pgs.

"U.S. Appl. No. 13/755,149, Notice of Allowance dated Jun. 28, 2017", 11 pgs.

"U.S. Appl. No. 13/755,149, Preliminary Amendment filed Feb. 19, 2013", 9 pgs.

"U.S. Appl. No. 13/755,149, Response filed Mar. 26, 2014 to Non Final Office Action dated Dec. 26, 2013", 9 pgs.

"U.S. Appl. No. 13/755,149, Response filed May 16, 2016 to Non Final Office Action dated Apr. 6, 2015", 4 pgs.

"U.S. Appl. No. 13/755,149, Response filed Aug. 12, 2014 to Final Office Action dated Jun. 12, 2014", 10 pgs.

"U.S. Appl. No. 13/755,149, Response filed Oct. 24, 2013 to Restriction Requirement dated Oct. 4, 2013", 1 pgs.

"U.S. Appl. No. 13/755,149, Response filed Oct. 31, 2016 to Non Final Office Action dated Aug. 25, 2016", 7 pgs.

"U.S. Appl. No. 13/755,149, Restriction Requirement dated Oct. 4, 2013", 5 pgs.

"U.S. Appl. No. 15/799,353, Non Final Office Action dated Sep. 19, 2019", 8 pgs.

"U.S. Appl. No. 15/799,353, Notice of Allowance dated Feb. 5, 2020", 9 pgs.

"U.S. Appl. No. 15/799,353, Preliminary Amendment filed Jan. 24, 2018", 7 pgs.

"U.S. Appl. No. 15/799,353, Response filed Dec. 19, 2019 to Non Final Office Action dated Sep. 19, 2019", 7 pgs.

"U.S. Appl. No. 16/796,659, Non Final Office Action dated May 27, 2021", 9 pgs.

"U.S. Appl. No. 16/796,659, Notice of Allowance dated Sep. 20, 2021", 9 pgs.

"U.S. Appl. No. 16/796,659, Preliminary Amendment filed Feb. 21, 2020", 6 pgs.

"U.S. Appl. No. 16/796,659, Response filed Aug. 26, 2021 to Non Final Office Action dated May 27, 2021", 7 pgs.

* cited by examiner

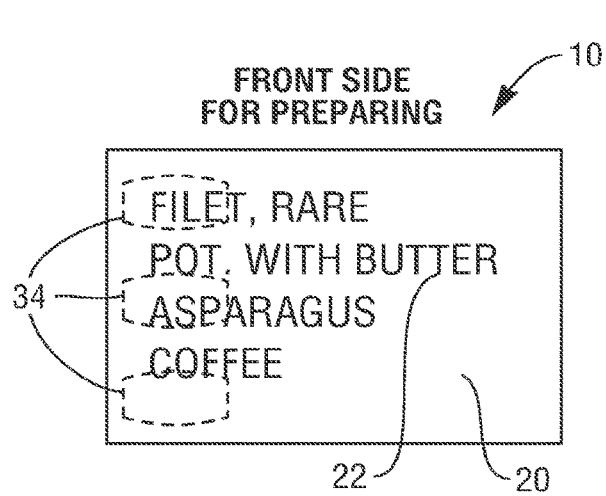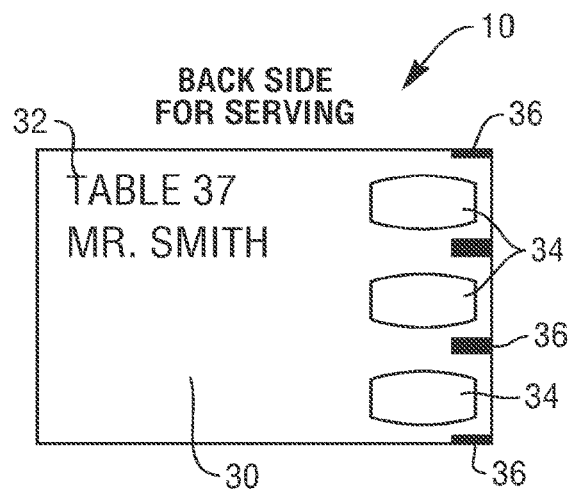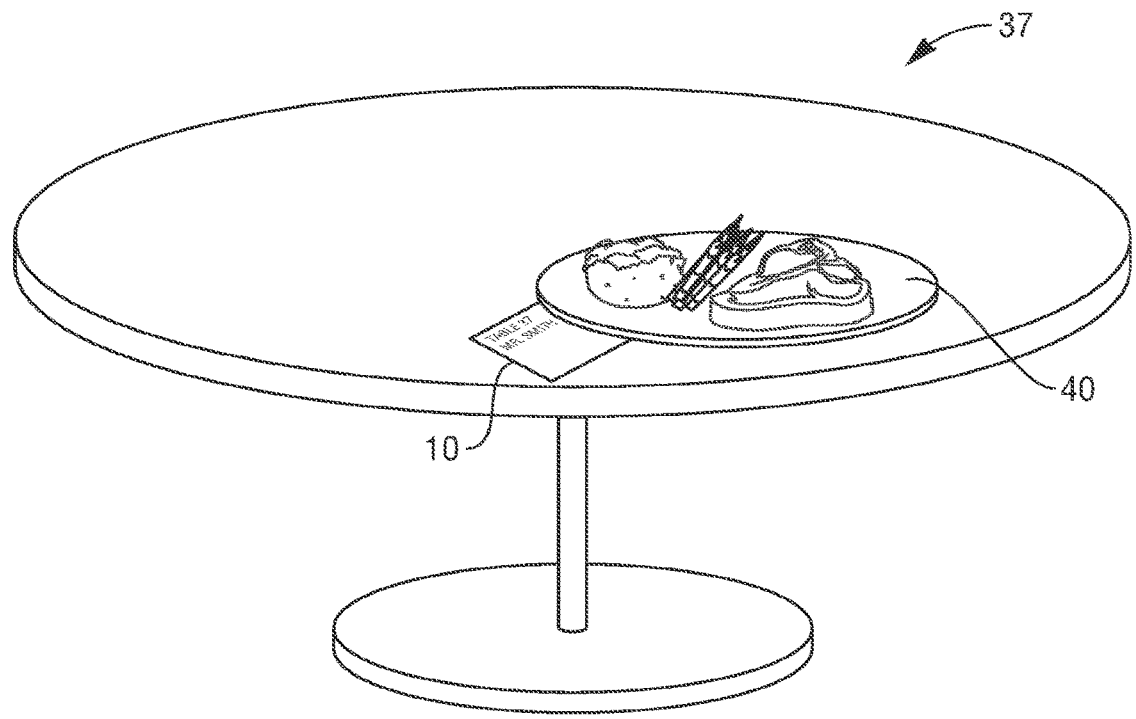

COMBINED LABEL FOR FOOD PREPARERS AND FOOD SERVERS IN TABLE SERVICE RESTAURANTS AND METHOD OF USING SAME

RELATED APPLICATIONS

The present application is a continuation of U.S. patent application Ser. No. 16/796,659, filed Feb. 20, 2020, which is a continuation of U.S. patent application Ser. No. 15/799,353, filed Oct. 31, 2017, issued as U.S. Pat. No. 10,664,934, issued on May 26, 2020, which application is a continuation of U.S. patent application Ser. No. 13/755,149, filed Jan. 31, 2013, issued as U.S. Pat. No. 9,886,728, issued on Feb. 6, 2018, the disclosures of which are incorporated by reference herein in their entirety.

BACKGROUND

The present application relates to food preparation and food service, and is particularly directed to a combined label for food preparers and food servers in table service restaurants and method of using same.

Table service restaurants have different methods of taking a food order from a table service customer, placing the food order with the kitchen, preparing the food order in the kitchen, and then delivering the prepared food order to the table of the customer. One method is for a food server to write the food order on an order ticket, and then hang the written order ticket above a preparation bar in the kitchen. A food preparer in the kitchen prepares the food order based on the written food order ticket, After the food preparer prepares the food on a serving dish, the food preparer places the serving dish on the preparation bar. The food server later picks up the serving dish from the preparation bar and delivers the serving dish to the table of the customer.

There are a number of drawbacks of the above-described method. One drawback is that the food preparer can easily place prepared food onto a wrong serving dish since serving dishes are on the preparation bar and food order tickets are hanging above the preparation bar. Another drawback is that the food server can easily pick up a serving dish from the preparation bar and deliver the serving dish to the wrong table and thereby deliver the serving dish to the wrong customer. It would be desirable to provide a method of taking a food order from a table service customer, preparing the food order without error, and then delivering the prepared food order to the customer without error.

SUMMARY

In accordance with one embodiment, a method is provided of processing a food order in a table service restaurant. The method comprises receiving a food order including a table identifier, and electronically by a computer terminal, printing a food order label including the table identifier and providing the printed food order label. The method also comprises by a food preparer, preparing a food dish based upon the printed food order label, and by the food preparer, placing the prepared food dish in a position in vicinity of the printed food order label. The method further comprises by the food preparer or a food server, picking up the prepared food dish and attaching the printed food order label to the food dish with the table identifier being visible, and by a food server, delivering the prepared food dish to the table indicated by the visible table identifier on the printed food order label and thereby delivering the prepared food dish to a customer in the table service restaurant.

BRIEF DESCRIPTION OF THE DRAWINGS

FIG. 1 is a front view of a combined label for use by food preparers and food servers in a table service restaurant in accordance with one embodiment.

FIG. 2 is a back view of the combined label of FIG. 1.

FIG. 3 is a pictorial view of the combined label of FIGS. 1 and 2 attached to a serving dish on a table in the table service restaurant.

DETAILED DESCRIPTION

Figure 4:
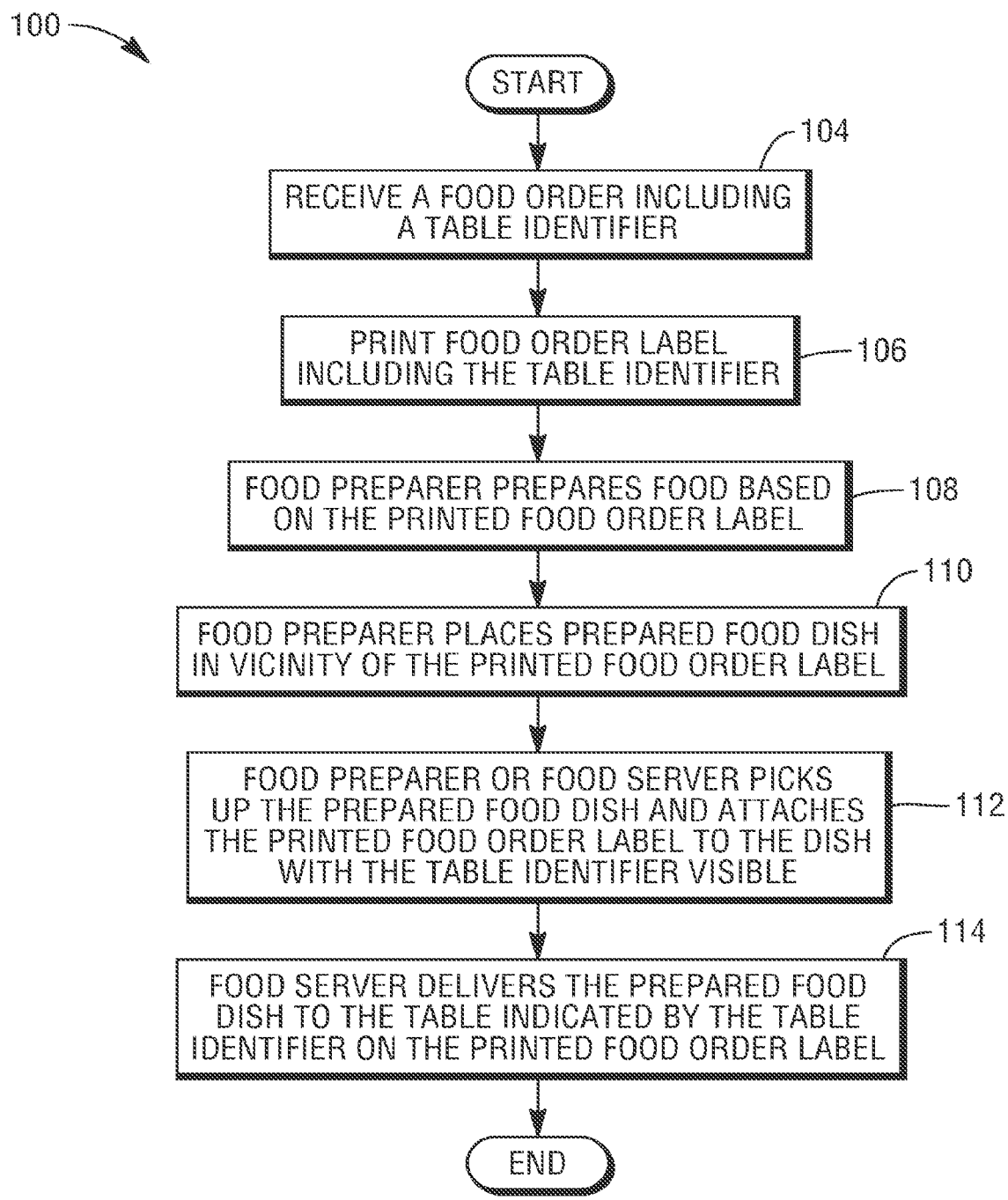
FIG. 4 is a flow diagram depicting a method of using the combined label of FIGS. 1 and 2 in accordance with one embodiment.

Referring to FIGS. 1 and 2, a combined label 10 is provided in accordance with one embodiment. The combined label 10 has a front major surface 20 (shown in FIG. 1) and a back major surface 30 (shown in FIG. 2). Either the front major surface 20 or the back major surface 30, or both, may comprise a thermally-sensitive coating layer to form either single-sided or dual-sided thermal paper. The front major surface 20 has alphanumeric information 22 which represents a customer food order placed in a table service restaurant, As shown in FIG. 1, the customer food order includes "a rare filet", "potato with butter", "asparagus", and "coffee".

The back major surface 30 has alphanumeric information 32 which represents either a table identifier of the table at which the customer who placed the food order is sitting or the name of the customer who placed the food order, or both. As an example in FIG. 2, both a table identifier and name of the customer are shown. The customer is sitting at table "37" in the table service restaurant, and the name of the customer is "Mr. Smith".

A pattern of adhesive 34, in the form of spots or strips, for example, is disposed on a portion of the back major surface 30 of the combined label 10. The pattern of adhesive 34, as shown in FIG. 2, is only an example pattern. It is conceivable that other adhesive patterns, or any combination of adhesive patterns, may be used.

A pattern of sense marks 36 are printed on the back major surface 30 of the combined label 10. Color of sense marks 36 may be black, for example, As shown in FIG. 2, locations of sense marks 36 on the back major surface 30 correspond to locations in which spots or strips of adhesive 34 are disposed between adjacent sense marks. Sense marks 36 indicate locations of spots or strips of adhesive 34, and tell the printer (not shown) where to cut to provide the combined label 10. As shown in the example of FIG. 2, the printer has made cuts on sense marks 36 to provide the combined label 10. It is conceivable that the printer cut at a location which is other than sense marks 36. Although sense marks 36 are shown in FIG. 2 as being on back major surface 30, it is conceivable that sense marks 36 be on front major surface 20. Also, sense marks 36 may be on the left edge or the right edge.

Referring to FIG. 4, a flow diagram 100 depicts a method of using the combined label 10 of FIGS. 1 and 2 in accordance with one embodiment. As shown in step 104, a food order including a table identifier is received. The food order and table identifier may be received in a number of different ways. One way is for a customer sitting at a table to place the food order using a self-ordering station located at the table. The table identifier is associated with the particular self-ordering station.

Another way is for a customer already sitting at a particular table to place the food order using the customer's smart phone or tablet, for examples. The customer also enters the table identifier which is associated with the particular table at which the customer is already sitting. The table identifier may be found on top of the table, on side of the table, or above the table, for examples.

Still another way is for a customer to place the food order through an Internet application at a smart kiosk which may be located in the table service restaurant. The smart kiosk generates a table identifier (e.g., a table number) which is then associated with the particular food order. The smart kiosk may then print out the table number that the customer would take to a table and display on some sort of clip that would hold the printed table number.

Yet another way is for a customer to pick up a table marker and then the place the food order at a counter with a human order taker. The order taker takes both the food order and the table marker from the customer, and enters it into a computer terminal of the restaurant. The table marker may also be bar-coded for ease of scanning by the order taker. The customer then takes the table marker to a table to uniquely identify the table.

The above are example ways of receiving the food order and table identifier. For simplicity and purposes of explanation hereinbelow, it will be assumed that a food server in the table service restaurant takes a food order from a customer sitting at a table in the table service restaurant. As an example, the name of the customer is "Mr. Smith", and Mr. Smith is sitting at table number "37". After the food server takes the food order from the customer, the food server enters the food order including a table identifier (which in this example is "37") into a computer terminal, The computer terminal may be a portable computer, for example, which may be used at tableside. The computer terminal then prints out a food order label 10 (as shown in FIGS. 1 and 2) which includes the food ordered on front major surface 20 and table identifier "37" and name "Mr. Smith" on back major surface 30, as shown in step 106.

As shown in step 108, a food preparer in the kitchen of the table service restaurant prepares food based on the printed food order label 10 printed by the computer terminal. After the food is prepared, the food preparer places the prepared food on a serving dish and places the serving dish in vicinity of the printed food order label 10 on a preparation bar (not shown), as shown in step 110. As an example, the dish may be placed next to the printed food order label 10 on the preparation bar.

Either the food preparer or the food server then picks up the dish and attaches the printed food order label 10 to the dish, as shown in step 112. As an example, the printed food order label 10 may be attached to the bottom of the dish. The printed food order label 10 is attached to be dish such that either the table identifier "37" or the name of the customer, or both, are visible as viewed from top of the dish. Then, as shown in step 114, the food server delivers the prepared food dish to the table indicated by the table identifier "37" appearing on the printed food order label 10, and thereby delivers the prepared food dish to the customer Mr. Smith.

As shown in FIG. 3, the prepared food dish (designated with reference numeral "40") is delivered to Mr. Smith at table "37" (designated with reference numeral "37"). The printed food order label 10 is shown attached to the bottom of the prepared food dish 40 with the adhesive 34 (shown in FIG. 2).

It should be apparent that combined label 10 is initially placed on the preparation bar with the front major surface 20 facing upwards so that the text information 22 representing the food order can be read by the food preparer to prepare the food order. After the food preparer in the kitchen has placed the prepared food dish 40 in the vicinity of the combined label 10, the combined label 10 is turned over with the back major surface 30 facing upwards so that the table identifier 37 and the name of the customer Mr. Smith, or both, can be read. The combined label 10 is attached in a manner to the prepared food dish 40 with the adhesive 34 such that the table identifier 37 and the name of the customer Mr. Smith, or both, remains visible when looking from above the prepared food dish 40. The food server is then able to deliver the prepared food dish 40 to the table at which the customer is sitting by reading the table identifier 37 on the combined label 10 now attached to the dish and visible from above the dish.

It should also be apparent that since the combined label 10 is adhesively-attached to the prepared food dish 40, the chance of error of the food preparer placing prepared food onto a wrong dish is reduced. Also, the chance of error of the food server delivering the prepared food dish 40 to the wrong table (and therefore the wrong customer) is reduced.

Although the above description describes a rectangular-shaped combined label 10, it is conceivable that other shapes are possible. Also, although the above description describes thermal paper being used to make combined label 10, it is conceivable that non-thermal paper may be used to make a combined label.

Further, although the above description describes combined label 10 being handled by a food preparer and a food server, it is conceivable that a person with a title other than a "food preparer" or a "food server" in the table service restaurant may handle combined label in the manners described. Also, it is conceivable that another person may handle the combined label. As an example, a person with a title of "order taker" may take the food order from the customer, the "food preparer" prepares the food order, and the "food server" delivers the prepared food order to the customer at the table.

Figure 5:
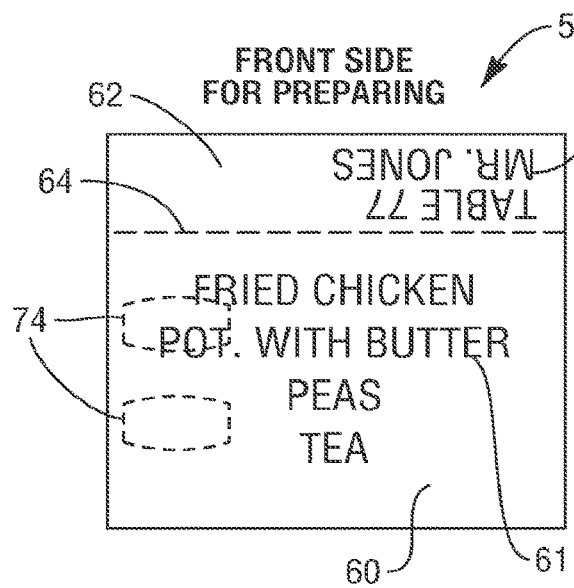
FIG. 5 is a front view of a combined label for use by food preparers and food servers in a table service restaurant in accordance with another embodiment.
Figure 6:
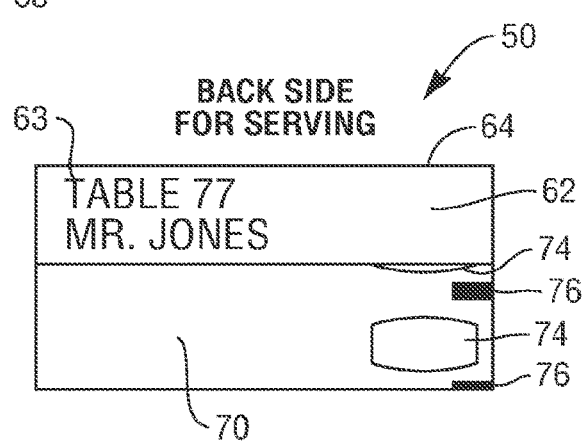
FIG. 6 is a back view of the combined label of FIG. 5 folded along a perforation.

Referring to FIGS. 5 and 6, a combined label 50 is provided in accordance with another embodiment. The combined label 50 has a first front major surface portion 60 (shown in FIG. 5), a second front major surface portion 62, and a back major surface 70 (shown in FIG. 6). Either the first and second front major surface portions 60, 62 or the back major surface 70, or both, may comprise a thermally-sensitive coating layer to form either single-sided or dual-sided thermal paper. A perforation 64 separates the first front major surface portion 60 and the second front major surface portion 62. The first front major surface portion 60 has alphanumeric information 61 which represents a customer food order placed in a table service restaurant. As shown in FIG. 5, the customer food order includes "fried chicken", "potato with butter", "peas", and "tea".

The second front major surface portion 62 has alphanumeric information 63 which represents either a table identifier of the table at which the customer who placed the food order is sitting or the name of the customer who placed the food order, or both, As an example in FIG. 6, both a table identifier and name of the customer are shown. The customer is sitting at table "77" in the table service restaurant, and the name of the customer is "Mr. Jones".

A pattern of adhesive 74, in the form of spots or strips, for example, is disposed on a portion of the back major surface 70 of the combined label 50. The pattern of adhesive 74, as shown in FIG. 6, is only an example pattern. It is conceivable that other adhesive patterns, or any combination of adhesive patterns, may be used.

A pattern of sense marks 76 are printed on the back major surface 70 of the combined label 50. Color of sense marks 76 may be black, for example. As shown in FIG. 6, locations of sense marks 76 on the back major surface 70 correspond to locations in which spots or strips of adhesive 74 are disposed between adjacent sense marks. Sense marks 76 indicate locations of spots or strips of adhesive 74, and tell the printer (not shown) where to cut to provide the combined label 50. As shown in the example of FIG. 6, the printer has made cuts on sense marks 76 to provide the combined label 50. It is conceivable that the printer cut at a location which is other than sense marks 76. Although sense marks 76 are shown in FIG. 6 as being on back major surface 70, it is conceivable that sense marks 76 be on first front major surface portion 60 or second front major surface portion 62, or both. Also, sense marks 76 may be on the left edge or the right edge.

Figure 8:
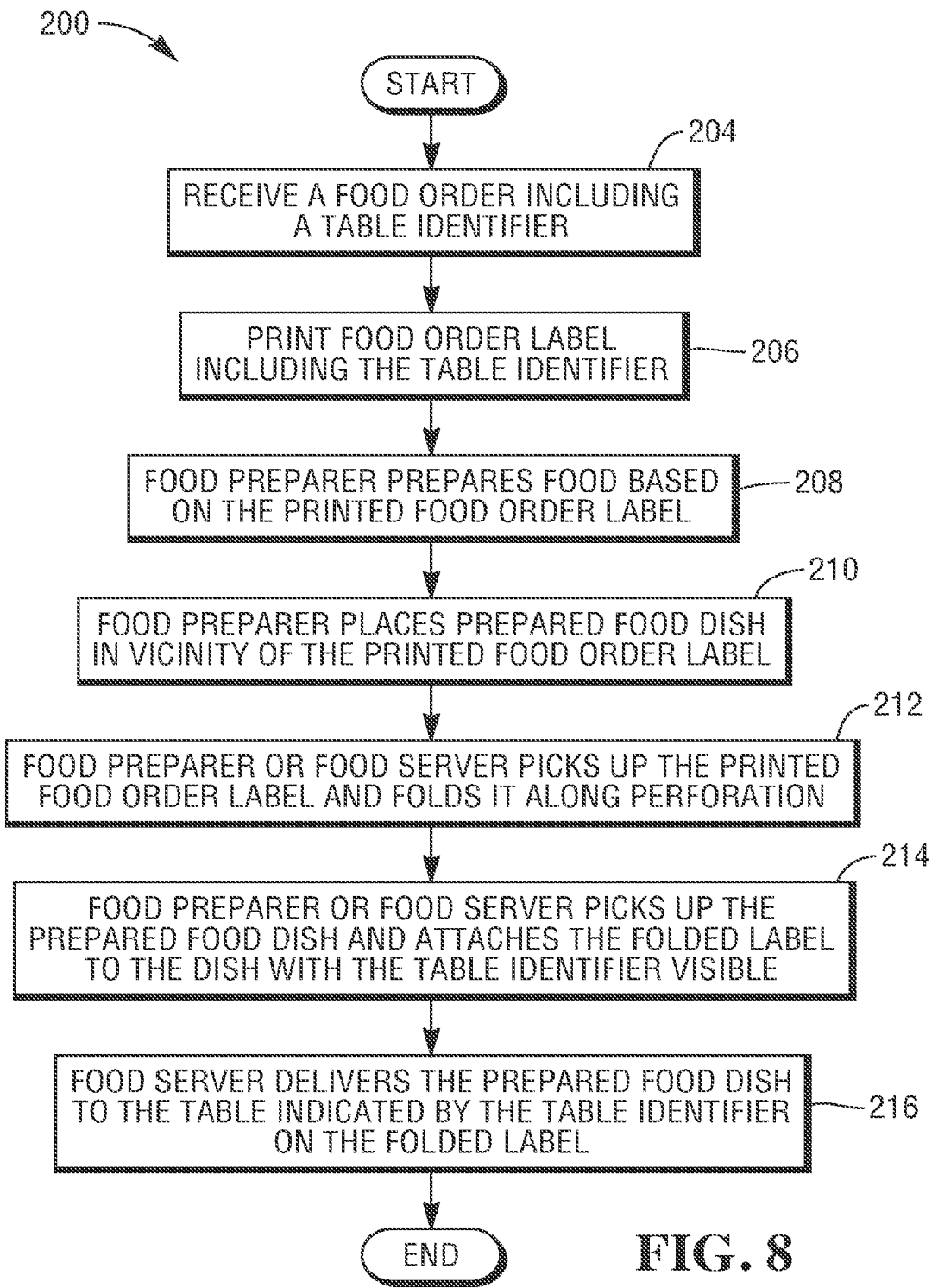
FIG. 8 is a flow diagram depicting a method of using the combined label of FIGS. 5 and 6 in accordance with one embodiment.

Referring to FIG. 8, a flow diagram 200 depicts a method of using the combined label 50 of FIGS. 5 and 6 in accordance with another embodiment. As shown in step 204, a food order including a table identifier is received. The food order and table identifier may be received in a number of different ways, such as those already described hereinabove in flow diagram 100 shown in FIG. 4. For simplicity and purposes of explanation hereinbelow, it will be assumed that a food server in the table service restaurant takes a food order from a customer sitting at a table in the table service restaurant. As an example, the name of the customer is "Mr. Jones", and Mr. Jones is sitting at table number "77".

After the food server takes the food order from the customer, the food server enters the food order including a table identifier (which in this example is "77") into a computer terminal. The computer terminal may be a portable computer, for example, which may be used at tableside. The computer terminal then prints out a food order label 50 (as shown in FIGS. 5 and 6) which includes the food ordered on first front major surface portion 60 and table identifier "77" and name "Mr. Jones" on second major surface portion 62, as shown in step 206.

As shown in step 208, a food preparer in the kitchen of the table service restaurant prepares food based on the printed food order label 50 printed by the computer terminal, After the food is prepared, the food preparer places the prepared food on a serving dish and places the dish in vicinity of the printed food order label 50 on a preparation bar (not shown), as shown in step 210. As an example, the dish may be placed next to the printed food order label 50 on the preparation bar.

Either the food preparer or the food server then picks up the dish and folds the printed food order label 50 along the perforation 64, and secures the backside of the second front major surface portion 62 to at least some of the adhesive 74 on the back major surface 70, as shown in step 212. Then, either the food preparer or the food server picks up the prepared food dish and attaches the folded, printed food order label 50 to the dish, as shown in step 214. As an example, the folded, printed food order label 50 may be attached to the bottom of the dish. The folded, printed food order label 50 is attached to be dish such that either the table identifier "77" or the name of the customer, or both, are visible as viewed from top of the dish, Then, as shown in step 216, the food server delivers the prepared food dish to the table indicated by the table identifier "77" appearing on the folded, printed food order label 50, and thereby delivers the prepared food dish to the customer Mr. Jones.

Figure 7:
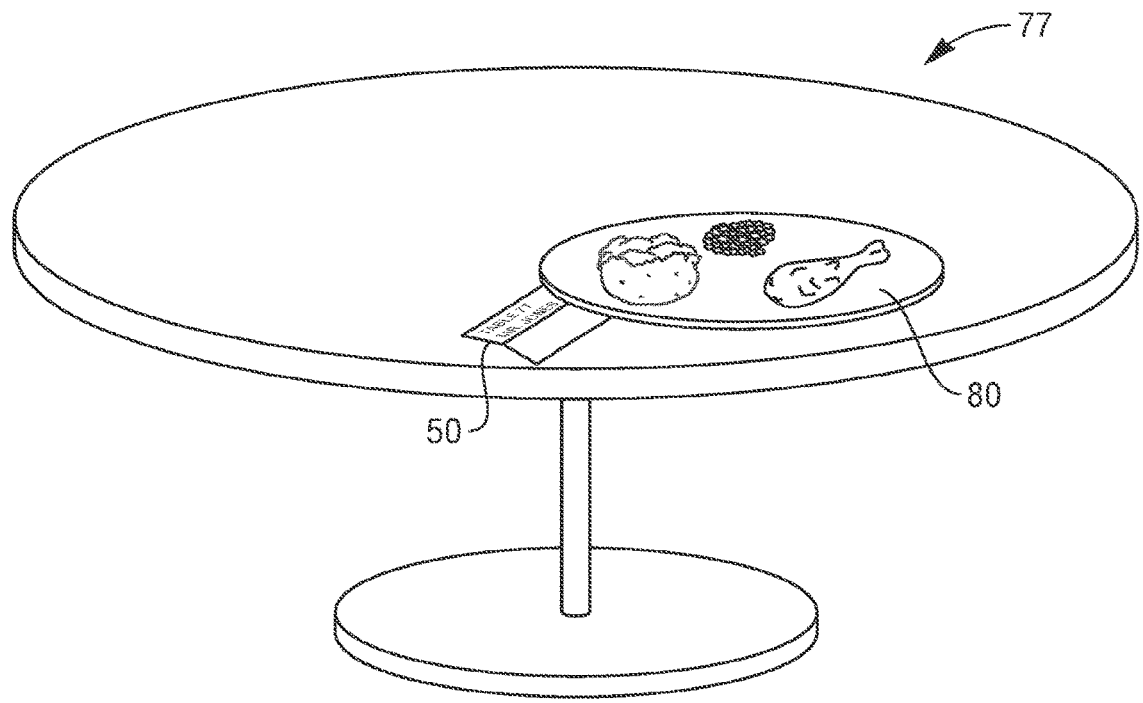
FIG. 7 is a pictorial view of the combined label of FIGS. 1 and 2. attached to a serving dish on a table in the table service restaurant.

As shown in FIG. 7, the prepared food dish (designated with reference numeral "80") is delivered to Mr. Jones at table "77" (designated with reference numeral "77"). The folded, printed food order label 50 is shown attached to the bottom of the prepared food dish 80 with the adhesive 74 (shown in FIG. 6).

It should be apparent that combined label 50 is initially placed on the preparation bar with the both the first front major surface 60 and the second front major surface 62 facing upwards so that the text information 61 representing the food order can be read by the food preparer to prepare the food order. Alter the food preparer in the kitchen has placed the prepared food dish 80 in the vicinity of the combined label 50, the combined label 50 is folded over along the perforation 64 such that the backside of the second front major surface portion 62 is secured to at least some of the exposed adhesive 74 on the back major surface 70. The combined label 10 is then attached in a manner to the prepared food dish 40 with at least some of the remaining exposed adhesive 74 such that the table identifier 77 and the name of the customer Mr. Jones, or both, remains visible when looking from above the prepared food dish 80. The food server is then able to deliver the prepared food dish 80 to the table at which the customer is sitting by reading the table identifier 77 on the combined label 50 now attached to the dish and visible from above the dish.

It should also be apparent that since the combined label 50 is adhesively-attached to the prepared food dish 80, the chance of error of the food preparer placing prepared food onto a wrong dish is reduced. Also, the chance of error of the food server delivering the prepared food dish 80 to the wrong table (and therefore the wrong customer) is reduced.

Although the above description describes a rectangular-shaped combined label 50, it is conceivable that other shapes are possible. Also, although the above description describes thermal paper being used to make combined label 50, it is conceivable that non-thermal paper may be used to make a combined label.

Further, although the above description describes combined label 50 being handled by a food preparer and a food server, it is conceivable that a person with a title other than a "food preparer" or a "food server" in the table service restaurant may handle combined label in the manners described. Also, it is conceivable that another person may handle the combined label. As an example, a person with a title of "order taker" may take the food order from the customer, the "food preparer" prepares the food order, and the "food server" delivers the prepared food order to the customer at the table.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A label, comprising:
   a substrate;
   an adhesive layer disposed on first portions of a backside of the substrate; and
   a print coating disposed on second portions of the backside of the substrate.

2. The label of claim 1, wherein the first portions are along one edge of the backside.

3. The label of claim 1, wherein the first portions are disposed between adjacent sense marks along the backside.

4. The label of claim 1, wherein the a front side of the substrate comprises a first printed indicia and the second portion of the backside comprises a second printed indicia.

5. The label of claim 4, wherein the label is adapted to adhere to a dish via the first portions, and wherein the first indicia comprising order details for an order with the second printed indicia comprising a table identifier and a name of a customer associated with the order.

6. The label of claim 5, wherein the first printed indicia and the second printed indicia are adapted to be visible with the label adhered to the dish.

7. The label of claim 1 further comprising, a first thermally sensitive coating disposed on a front side of the substrate.

8. The label of claim 7, wherein the second portions comprise a second thermally sensitive coating disposed thereon.

9. The label of claim 1, wherein the first portions of the adhesive layer arranged in a pattern on the backside of the substrate.

10. The label of claim 9, wherein the adhesive layer is disposed in spots of strips within the pattern.

11. The label of claim 1, wherein the first portions comprises a plurality of locations along a right or a left edge of the backside, each location separated or delineated by a sense mark.

12. The label of claim 11, wherein the sense marks printed on third portions of the backside of the substrate, each sense mark separating a particular pair of the locations, a top edge of the substrate, or a bottom edge of the substrate.

13. A label, comprising:
    a substrate;
    sense marks disposed along a first edge a backside of the substrate; and
    adhesive strips disposed between pairs of the sense marks.

14. The label of claim 13 further comprising:
    a first thermally sensitive coating disposed on a front side of the substrate.

15. The label of claim 14 further comprising:
    a second thermally sensitive coating disposed on a portions of the backside that is separate from both the adhesive strips and the sense marks.

16. The label of claim 13, wherein the adhesive strips are disposed on a first area of the backside with and between the pairs of the sense marks and a. second area of the backside comprises a print coating adapted to print in the second area.

17. A label, comprising:
    a substrate;
    sense marks disposed in first areas of a backside of the substrate;
    adhesive disposed in second areas of the backside of the substrate;
    a print coating disposed in third areas of the backside of the substrate; and
    the print coating disposed on a front side of the substrate.

18. The label of claim 17, wherein each second area is situated between a unique pair of the first areas.

19. The label of claim 17, wherein the print coating is a thermally sensitive print coating and the substrate is a. thermal paper.

20. The label of claim 17, wherein the substrate is a non-thermal paper.

* * * * *